(12) United States Patent
Davis et al.

(10) Patent No.: US 6,260,062 B1
(45) Date of Patent: Jul. 10, 2001

(54) ELEMENT MANAGEMENT SYSTEM FOR HETEROGENEOUS TELECOMMUNICATIONS NETWORK

(75) Inventors: Kenton T. Davis, Falls Church, VA (US); William H. Dudley, Addison, TX (US); Derek Gallagher, Washington, DC (US); Ken Gee, Reston; Pauric McCabe, Arlington, both of VA (US); Eric Podietz, Dresher, PA (US); Shao Weidong, Greenbelt, MD (US)

(73) Assignee: Pathnet, Inc., Reston, VA (US)

( * ) Notice: Subject to any disclaimer, the term of this patent is extended or adjusted under 35 U.S.C. 154(b) by 0 days.

(21) Appl. No.: 09/288,622

(22) Filed: Apr. 9, 1999

Related U.S. Application Data

(60) Provisional application No. 60/121,425, filed on Feb. 23, 1999, and provisional application No. 60/121,429, filed on Feb. 23, 1999.

(51) Int. Cl.[7] .................................................... G06F 13/00
(52) U.S. Cl. .............................................................. 709/223
(58) Field of Search ............................................... 709/223

(56) References Cited

U.S. PATENT DOCUMENTS

| | | | |
|---|---|---|---|
| 5,742,845 | 4/1998 | Wagner | 710/11 |
| 5,905,908 | * 5/1999 | Wagner | 710/11 |
| 5,970,120 | * 10/1999 | Kasrai | 379/9 |
| 6,104,796 | * 8/2000 | Kasrai | 379/201 |
| 6,122,363 | * 9/2000 | Friedlander et al. | 379/230 |

OTHER PUBLICATIONS

"HP Open View Element Management Framework", Hewlett Packard OpenView Telecoom Division Marketing—Jun. 1997.

"Technical Evaluation Guide, Hewlett–Packard OpenView GDMO Modeling Toolkit", 1997 Hewlett–Packard Company.

"TMN Technical Evaluation Guide", HP Open View Telecom, Edition 1, Hewlett–Packard Company, Nov. 17, 1997.

"A Survey of Market Trends and Competitor deployments in OSI Network Management", Bill Dudley, Supervisory Systems Department, Network Management Division, NEC America, Inc., Sep. 1996.

(List continued on next page.)

*Primary Examiner*—Kenneth R. Coulter
(74) *Attorney, Agent, or Firm*—Covington & Burling

(57) ABSTRACT

The element management system ("EMS") of the present invention addresses the need for effective and efficient management of heterogeneous telecommunications networks that include network elements of different types, such as radios and fiber optic devices, made by different manufacturers. This EMS provides a core set of element-independent network management messages that support basic network management functions, such as fault and performance monitoring and configuration management. Element-independent messages to an individual network element are mapped to an element-dependent message for that network element; messages from individual network elements are correspondingly mapped into the core set of element-independent messages. Management applications and user interfaces in the EMS thus send and receive network management information using the core set of messages, in the common protocol of those messages. The EMS of the present invention thus supports rapid and low-cost integration of additional network elements of different types and different manufacturers, additional management functionality and additional and modified telecommunications services. The present invention also provides a method for developing the core set of element-independent network management messages for basic telecommunications management functions.

24 Claims, 5 Drawing Sheets

OTHER PUBLICATIONS

"Technical Evaluation Guide, Hewlett–Packard Open View Managed Object Toolkit", Copyright Oct. 4, 1996, Hewlett–Packard Company.

"Technical Overview, HP Open View Telecom, DM TMN Version 5.03, CORBA Version 5.1", Copyright 1998 Hewlett–Packard Company.

"Technical Evaluation Guide, HP Open View Element Management Framework", Copyright 1997 Hewlett–Packard Company.

"Integrated Transport Management Releases the Power of Your Optical Network", Copyright 1998 Lucent Technologies.

"HP Open View Telecom SmartService", Copyright 1997 Hewlett–Packard Company.

"HP Open View Telecom Event Correlation Service (ECS) for Telecom Management Applications", Copyright 1997 Hewlett–Packard Company.

"HP Open View Telecom Platforms, Developer Kits and Platforms For Telecom Management Applications", Copyright 1997 Hewlett–Packard Company.

"HP Open View Telecom TMN Designer, Rapid and Dynamic Information Modeling and Prototyping", Copyright 1998 Hewlett–Packard Company.

"HP Open View Telecom TMN Manager, HP Open View Telecom TMN Agent, Developer and Runtime Platforms for Manager and Agent Applications", Copyright 1998 Hewlett–Packard Company.

"HP Open View Telecom TMN Proxy, Developer and Runtime Platforms for Dynamically Configurable TL1–to Q3 Adaption Applications", Copyright 1998 Hewlett–Packard Company.

"HP Open View Telecom ISV Partner Program", Copyright 1997 Hewlett–Packard Company.

"HP Open View Element Management Framework for New Wireline Networks", Copyright 1996 Hewlett–Packard Company.

"Automated business interconnection", Feb. 9, 1998 edition of Telephony.

"Operations overall", Oct. 13, 1997 edition Telephony.

"Speeding Services to Market", D. Francisco de Miguelsanz Puelles, Nov. 1997 edition of Telecommunications.

"Network management", Todd Goldman, Nov. 1997 edition of Global Telephony.

"In Pursuit of the Optimal Network, How can a progressive telco fine tune its network to improve customer services?", Jukka Rantala, Nov. 1997 edition of Telecommunications.

"Bull: The Secret Is Out", Sean Gallagher, Mar. 9, 1998 edition of Information Week.

Bull HN Information Systems Inc.'s proposal for "A TMN Compliant Network Management System" for Pathnet, Inc., Mar. 23, 1998.

"Proposal to Pathnet For Network Management Solution", Digital Equipment Corporation, Apr. 1998.

"HP OpenView Element Management Framework for Wireless Networks", Copyright 1996 Hewlett Packard Company.

* cited by examiner

ELEMENT MANAGEMENT SYSTEM FOR HETEROGENEOUS TELECOMMUNICATIONS NETWORK

CROSS REFERENCE TO RELATED APPLICATIONS

In connection with this application, priority is claimed to the following provisional applications: SYSTEM AND METHOD FOR NETWORK CONFIGURATION MANAGEMENT, U.S. Ser. No. 60/121,425, filed Feb. 23, 1999, and SYSTEM AND METHOD FOR NETWORK MANAGEMENT, U.S. Ser. No. 60/121,429, filed Feb. 23, 1999.

FIELD OF THE INVENTION

The present invention relates to element management systems for telecommunications networks. More particularly, the present invention relates to element management systems designed to monitor, control and configure a number of diverse network elements, such as microwave radios and telecommunications multiplexers, regardless of the communications protocol, type of interface or manufacturer of the individual network elements.

BACKGROUND ART

Driven by government deregulation of telecommunications services and the rapid introduction of new telecommunications networking technologies, the telecommunications industry has experienced unprecedented growth and change in recent years. The increasing demand for distributed computing systems and instant availability of online services and information has made access to reliable high-speed telecommunications networks essential to the daily activities of corporate enterprises and individuals alike. To meet the demand for the latest technology and additional capacity, literally hundreds of telecommunications vendors now compete with each other in the marketplace for telecommunications solutions, offering a large variety of services and technologies, some offered as propriety, some offered as "standard," and some offered as "quasi-standard."

As competition among telecommunications vendors has grown, so has the size, complexity and heterogeneity of modern telecommunications networks. These complex heterogeneous telecommunications networks, which may span thousands of miles of territory, can—and frequently do—contain thousands of different network elements of various types, made by different manufacturers, and using different communications protocols.

Managing these large, complex and heterogeneous telecommunications networks presents substantial challenges. For each network element, a network manager needs to know whether the elements are operating properly and what are the nature and severity of any problems. For most networks, it is highly desirable to obtain this information at a network management facility without having to dispatch personnel to the physical location of the network element. Systems that provide this information from a network element to a network management center, usually by telecommunications links, are known as element management systems ("EMSs"). Once management information regarding a network element is transmitted to the network management center, the network manager can analyze the information and direct corrective or other appropriate action. Once again, it is desirable for at least certain actions—such as shutting down an overheating radio before it burns itself out, or rerouting traffic away from a malfunctioning multiplexer—that the action be taken at the network element site as the result of a command transmitted from a remote network management center. Similarly, it is desirable, to the extent possible, to control and configure network elements remotely from the physical location of the individual elements. EMSs are used for these purposes, as well.

Network elements of different types, such as radios and multiplexers, typically require separate EMSs, even if they are manufactured by the same company. Historically, an EMS for a particular network element could only be obtained from the element's vendor, usually at a substantial price. If, for example, a telecommunications network contains four different models of digital radios, the network administrator typically has to purchase and support four different EMSs, even if all the radios are from the same manufacturer. Thus, managing a telecommunications network containing network elements of different types, different protocols and different manufacturers is almost always costly.

In addition, different manufacturers frequently use different protocols and commands for managing their network elements. Often, the same manufacturer uses different protocols and commands for different types of equipment that it manufactures. Indeed, even when a manufacturer claims to use a "standard" protocol for managing network elements (such as Q3, TL-1 or SNMP), it is not uncommon for that manufacturer to implement that protocol differently from other manufacturers. Moreover, documentation for a specific EMS and a specific network element may be unavailable, incomplete, out-of-date or incorrect. Hardware and software have bugs and limitations which also must be addressed.

As a consequence of these and other problems, the expertise required to program, manage and troubleshoot a particular EMS for a particular type of network element made by one manufacturer is ordinarily of limited use when it comes to programming, managing and troubleshooting a different EMS for a different type of network element or even the same type of network element made by a different manufacturer. Thus, people who become experts at supporting particular EMSs and network elements ordinarily cannot efficiently apply those skills to supporting other EMSs or other types of network elements.

It is therefore not uncommon for a single operator to maintain separate teams of experts for each type of network element in its telecommunications network. Network administrators who have already invested substantial sums of money in purchasing separate EMS systems for a variety of network elements, potentially made by different manufacturers, may also have to invest substantial sums of money and resources to develop and maintain the expertise required to support each type of network element made by each manufacturer.

Network administrators trying to reduce the costs associated with employing separate teams of expert programmers for each type of network element have attempted to purchase and use commercial off-the-shelf telecommunications network management solutions to manage their network elements. These management solutions, however, can be extremely expensive, frequently support only certain network elements, and can require extensive system integration and customization efforts. Consequently, a network administrator using a commercial off-the-shelf network management application often still has to purchase separate commercial off-the-shelf applications for each type of network element, or for each manufacturer of network elements used in the telecommunications network.

Moreover, most commercial off-the-shelf network management solutions are geared towards the "legacy" architectures of older telecommunications network management solutions. These legacy-based solutions frequently do not support the more recent protocols, such as CORBA and Q3, or do not support a particular manufacturer's implementation of the more recent protocols, without expensive modifications. Indeed, some legacy-based solutions may require the network administrator to change the methodology of managing the entire telecommunications network.

In addition, due in large part to the problems discussed above, many commercial element management systems available today lack scalability. Each time an organization or network administrator wants to add a new type of network element to the telecommunications network, or to start using a new manufacturer, a new team of experts or a new network management application, or both, must also be added. This also usually means that the organization or network administrator must be prepared to take on a large and expensive integration effort, adding further to the costs and complexity of upgrading the network.

Another problem faced by telecommunications network administrators today is that commercial or third-party EMSs may not provide the level of flexibility required for certain telecommunications network applications. For example, if a telecommunication network requires new or custom user interfaces, new functionality or new reporting capabilities, many commercial EMSs lack the flexibility to deploy such new or customized applications easily and inexpensively.

Accordingly, today's telecommunications network administrators are frequently captive to the type and manufacturers of network elements utilized in their current network. Often, the manufacturer and type of network elements already present in the network effectively determine which type of network elements can be added to the network, or from which manufacturer new network elements can be obtained, what kind of expertise must be obtained to manage the new network elements and which brand of network management software can be used. Once deployed, networks and their management solutions must be supported for many years if the organization has any hope of recouping the substantial initial investments required. This often leads telecommunications network managers to conclude that they have lost control over the growth and development of their own telecommunications networks. This lack of control severely restricts an organization's ability to expand or modify its network, integrate new technology and respond in a timely manner to their organizations telecommunications requirements.

In an attempt to begin to address some of these problems, the International Telecommunications Union ("ITU") promulgates a set of telecommunications specifications known as Telecommunications Management Network ("TMN") standards. The TMN standards defines relationships between basic network building blocks (i.e., different network elements, different network protocols and different network management applications) in terms of standard interfaces.

The TMN standards defines five major functional areas for network management systems, based on key activities performed by network management personnel, including:

Fault Management—including trouble management, corrective actions for service, fault reporting and recovery;

Configuration Management—including resource provisioning (timely deployment of resources to satisfy expected service demands), service provisioning (assigning services and features to end-users), and configuration of equipment and resources;

Performance Management—including processes that insure the most efficient utilization of network resources and their ability to meet service demands, and collection, correlation, and analysis of data regarding the service performance of network resources;

Security Management—including control of access to and protection of both the network and network management systems against intentional and accidental abuse, unauthorized access, and communications loss; and Accounting Management—including processes that maintain customer billing as well as resource inventory.

The TMN architecture provides for a division of management capabilities according to layers. Each layer provides a set of the functional elements (that is, Fault, Performance, Configuration, Security, and Accounting Management). Not all functional elements are required at each layer. The TMN Layers (from bottom to top) are:

Network Element Layer—This layer typically provides the interface for managing the NE itself.

Element Management Layer—This layer provides capabilities provide for managing multiple network elements usually of the same type or manufacturer. Typically, this layer emphasizes fault management, configuration management, performance management and security for the NEs.

Network Management Layer—This layer provides network management for a full network, including circuit configuration, performance, and fault management, as well as provisioning of bandwidth.

Service Management Layer—This layer provides for network management of the services provided by the network, such as inventory (accounting management) of bandwidth and services.

Business Management Layer—This layer provides for network management of billing, service allocation, and other business aspects of the network.

A wide variety of protocols (e.g., Q3, CORBA, SNMP and TL-1) is used as the communications media between TMN layers. The Q3 protocol is widely used in Europe and Asia as the network management protocol of choice for numerous network elements—especially transport networks, that is, networks that transfer information at very high speeds using fiber optic and digital microwave radio. Q3 has also seen a surge of activity in the United States, especially in Synchronous Optical Network ("SONET") and Dense Wave Division Multiplexing ("DWDM") deployments. Toolkits to build applications using Q3 are supplied by companies such as Vertel, DSET Corporation, HP, and Sun Microsystems.

In the telecommunications network management industry, the Common Object Request Broker Architecture ("CORBA") is increasingly being used for integration of telecommunications software applications and NEs. Essentially, CORBA is a specification for an object-oriented architecture for distributed applications. CORBA implementations are provided by a number of companies, the most widely deployed is called Orbix™ from IONA Technologies.

SNMP, or Simple Network Management Protocol, is a simple protocol for managing TCP/IP (or Internet-based) computer networks. SNMP is widely deployed as a management protocol for routers, bridges and other computer-network related devices. In recent years, SNMP has been extended as a management protocol for many telecommunications network elements, most specifically, ATM (Asynchronous Transfer Mode) switches and routers. The SNMP protocol is in the public domain, consequently, there are numerous deployments and implementations.

TL-1 is by far the most widely used protocol in telecommunications management. Most of today's transport network elements deploy TL-1 as the management protocol. Although there is some standardization to TL-1, most vendors implement either a subset or superset of the TL-1 commands.

Accordingly, there is a need for flexible and scalable element management systems for telecommunications networks that can monitor and manage very large, heterogeneous telecommunications networks and support rapid, low-cost integration of new and different network element types having a variety of protocols and a variety of manufacturers.

SUMMARY OF THE INVENTION

An objective of the present invention is to provide a telecommunications network element management system ("EMS") for controlling a plurality of diverse network elements, regardless of the type, protocol or manufacturer of the network elements ("NEs").

A further objective of the present invention is to provide an EMS utilizing a core message set that all NEs in the network can support, thereby reducing redundancy and minimizing the effort and expense required to integrate new and diverse NEs.

Another objective of the present invention is to provide an EMS sufficiently flexible to support network management functions common to diverse NEs.

Another objective of the present invention is to provide a highly-scalable EMS, capable of supporting a large number of NEs.

A further objective of the present invention is to provide an EMS having a mechanism for incorporating diverse network management interfaces, thereby making the applications and services of the EMS independent of the protocol used by individual NEs in the telecommunications network.

The present invention, as broadly described herein, provides a method for developing a core set of messages for an EMS for a telecommunications network, comprising the steps of: reviewing telecommunications network management functions for each of a plurality of NEs; selecting the basic telecommunications network management functions; and creating an element-independent telecommunications network management message, in a common telecommunications management message protocol, for each selected telecommunications management function.

The present invention, as broadly described herein, also provides an EMS for a telecommunications network comprising means for receiving, from a software application, a downstream element-independent network management message selected from a core set of downstream element-independent network management messages, for transmission to a NE. The EMS further includes means for mapping the downstream element-independent network management message into a downstream element-dependent network management message, and into an element-dependent protocol, for the NE. The EMS also includes means for transmitting the downstream element-dependent network management message to the NE. As used in this specification and the appended claims, the term "downstream" means a logical transmission path towards a NE, regardless of the actual physical implementation or embodiment.

The EMS of the present invention may further comprise means for receiving an upstream element-dependent network management message from a NE. This EMS also includes means for mapping the upstream element-dependent network management message into a upstream element-independent network management message selected from a core set of upstream element-independent network management messages, and into a common element-independent message protocol. The EMS also includes means for transmitting the upstream element-independent network management message to a software application. As used in this specification and the appended claims, the term "upstream" means a logical transmission path away from a NE, regardless of the actual physical implementation or embodiment.

In a preferred embodiment, the EMS in accordance with the present invention optionally includes means for receiving an unsolicited element-dependent network management message, such as an alarm, from a NE, means for mapping the unsolicited element-dependent network management message into an element-independent network management message identifying the NE and the nature and priority of the unsolicited element-dependent network management message, and means for transmitting the element-independent network management message to a software application.

In a preferred embodiment, the EMS in accordance with the present invention optionally provides support for NEs of more than one type, or more than one manufacturer, or both.

In a preferred embodiment of an EMS according to the present invention, the core set of downstream element-independent network management messages comprises a reduced number of downstream network management message supporting basic telecommunications network management functionality. In a preferred embodiment, basic network functionality comprises core network management functions common to a broad array of equipment types and core network management functions specific to particular equipment types. In today's environment, a preferred embodiment of the present invention would support equipment types such as microwave radios, add/drop multiplexers, terminal multiplexers and fiber regenerators.

Additional objects and advantages of the invention are set forth in part in the description that follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Notably, the present invention may be implemented using software, hardware or any combination thereof, as would be apparent to those of ordinary skill in the art, and the figures and examples below are not meant to limit the scope of the present invention or its embodiments or equivalents.

A method of developing a core set of messages for an element management system according to the present invention will now be described in detail with reference to FIG. 1. That figure provides a process flowchart illustrating the steps performed in developing a core set of messages for an element management system in accordance with the present invention, comprising the steps of (a) reviewing telecommunications network management functions for each of a plurality of telecommunications NEs; (b) selecting basic telecommunications network management functions; and (c) creating an element-independent telecommunications network management message, in a common telecommunications message protocol, for each selected telecommunications management function.

Figure 1:
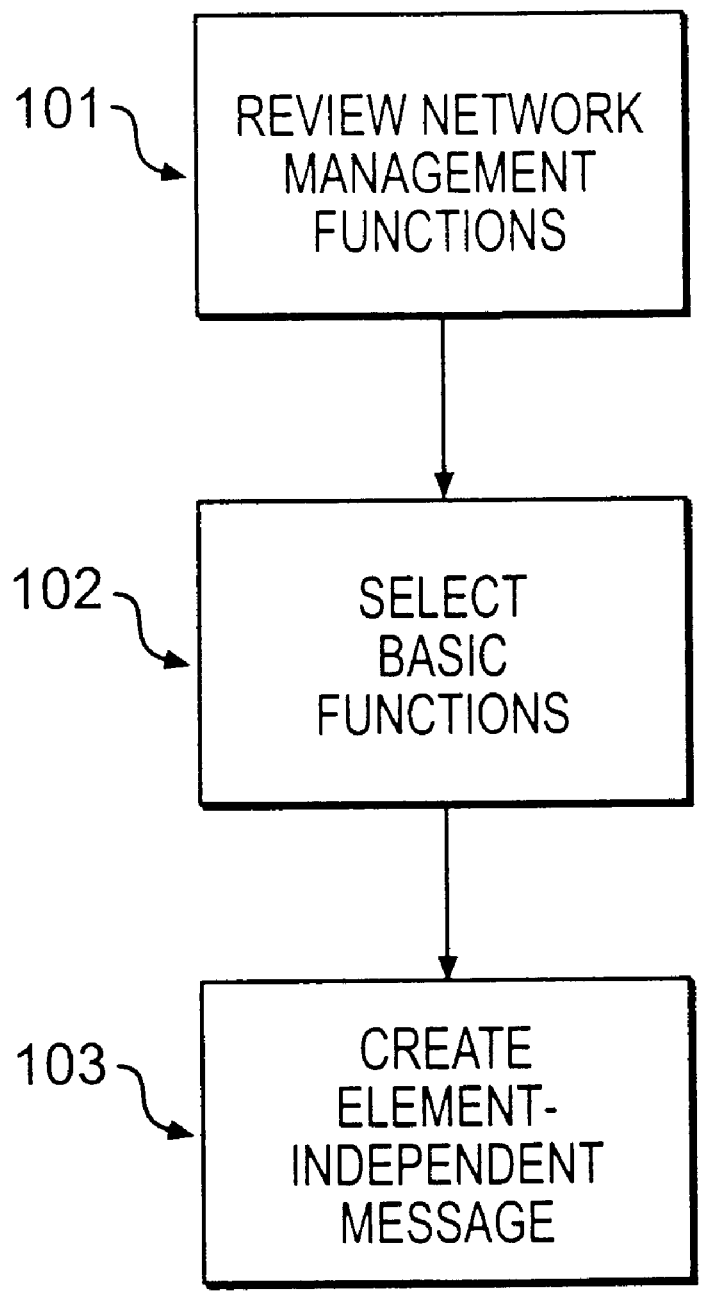
FIG. 1 provides flowchart of a method of the present invention for developing a core set of messages for an element management system for a telecommunications network.

In a preferred embodiment depicted in FIG. 1, the step of reviewing telecommunications network management functions for each of a plurality of telecommunications NEs is performed at Review Network Management Functions step 101. For this step the functional specifications for each of a plurality of telecommunications NEs may be obtained, for example, by requesting them directly from the vendors, searching for them on the Internet, or by means generally known to those of ordinary skill in the art.

Once the functional specifications of a network element are obtained, they are reviewed and audited for several purposes, including identification of the NEs network management functions, such as retrieving the operating temperature of the device, and identifying the specific network management protocols, such as Q3, TL-1 or SNMP, used by the NE. These specifications are also reviewed to ascertain which network management functions are common to types of NEs made by several manufacturers, as well as different types of NEs.

As depicted in FIG. 1, in a preferred embodiment the step of selecting basic telecommunications network management functions is performed at Select Basic Functions step 102. The goal of this step is to develop, from the telecommunications management functions reviewed at Review Network Management Functions step 101, a reduced or core set of messages that encompasses no more and no less than the basic functionality required to manage a telecommunications network. Several considerations affect this selection process. In a preferred embodiment, consideration is given to the commonality of a network management function across different network element types and manufacturers. The more common a function, the more likely its inclusion in a core set of basic functions. In a preferred embodiment, consideration is also given to industry-wide consensus as to which management functions are considered basic or necessary or essential, or merely desirable. In a preferred embodiment, consideration is also given to projections as to future types or features of NEs and the management functions they will need to support and by which they will need to be supported. In a preferred embodiment, consideration is also given to the importance of the goal of keeping as small as practicable the number of messages to implement basic network management functions. Achieving this goal is important to scalability of an EMS and to the ability quickly and efficiently to add NEs of different types and manufacturers. At the same time, if the selected set of basic management functions is too small, then important functions may be excluded or NEs of certain types or manufacturers may not be adequately supported. It is therefore contemplated that the core set of network management functions selected according to the present invention may change in response to changes in telecommunications requirements, network implementation practices and industry consensus.

Telecommunications NEs can usefully be classified according to type. Various types of telecommunications NEs, such as microwave radios and fiberoptic multiplexers, typically support and require distinct kinds of network management functionality. Certain network management functions for multiplexers, for example, are not appropriate for microwave radios. For example, in a preferred embodiment, where the NE is an add/drop multiplexer, pairs of optical interfaces may be cross-connected on command from the EMS to complete a circuit through the multiplexer. This operation is not available—nor does it make sense—inn the case where the NE is a microwave radio.

On the other hand, certain network management functions would be viewed by a person of ordinary skill in the art as common to all telecommunications NEs within a telecommunications network, regardless of the type of the NE. The network management function of setting the time on a specified telecommunications NE, for example, should be supported by all telecommunications NEs, regardless of whether the element is a radio, a multiplexer or another type of device.

In order to reduce redundancy in developing and using a core set of network management messages according to the present invention, in a preferred embodiment the basic common network management functions are identified separately from the basic network management functions for specific types of NEs. It is then preferable, according to a preferred embodiment of the present invention comprising a network with radio and fiber optic devices, to subdivide the basic type-specific network management functions into basic microwave radio network management functions and basic fiber optic device network management functions. The two classes of telecommunications NEs referenced herein, as well as the basic network management functions related to these two classes, are mentioned by way of example only. Other types of telecommunications NEs having other basic network management functions, as known to those of ordinary skill in the art, may also be present in the telecommunications network and are envisioned to fall within the scope of this invention.

In a preferred embodiment of the present invention, the basic common network management functions, for each NE, include the functions of:

Setting a time clock for the NE.

Retrieving performance data for a specified time period for the telecommunications NE. Such data would include, for example, the total number of seconds in a specified time period that the telecommunications NE was unavailable, the total number of seconds in a specified time period that the telecommunications NE sustained severe errors, the total number of framing error sustained by the telecommunications NE in a specified time period, and other performance data as would be apparent to one of skill in the art.

Setting performance management threshold values for the telecommunications NE. This function, for example, specifies which attributes to monitor on the telecommunications NE and what kind of alarm will be generated if any of these monitored values falls outside the specified threshold. This function could be used, for example, to generate a specific alarm when the number of framing errors on the telecommunications NE exceeds a certain value.

Updating the external output control attributes on the telecommunications NE. For example, the state (e.g., polarity) of an external output control may be changed from "normally ON" to "normally OFF." Another example would be to set the "pulse" attribute to indicate that the external output control is a "pulse" instead of a "latch."

Sending a signal to the external output interface on the NE for the purpose of controlling external equipment, such as a generator. For example, by sending a pulse control, the generator can be started.

Updating the external input control attributes on the telecommunications NE. Such attributes include, by way of example, the setting of the user label attribute to indicate the name of an assigned input device and other attributes as would be apparent to one of skill in the art. Such external input points are typically assigned to external devices to be monitored by the EMS such as shelter doors, power capabilities, shelter and equipment temperatures, smoke and fire detectors, tower lights and other input devices.

Retrieving operational status information of the telecommunications NE, such as whether the NE is "in service" or "out of service."

Retrieving, entering, editing and removing the telecommunications NE from the EMS.

Retrieving and updating protection status for the telecommunications NE. Protection status for a telecommunications NE indicates whether the telecommunications NE has an active backup facility, such as a redundant channel, for use if the primary facility (or channel) becomes unavailable to carry traffic. For example, a digital microwave may be configured as a "1+1," meaning that there is one primary radio link between radio antennas and one backup link. If the primary link goes down for any reason, the radio will automatically switch to the backup radio link, using separate antennas, separate receivers and separate transmitters.

Processing the current standing alarms for the specified telecommunications NE. Such alarms would include, for example equipment, environmental, communications, facility, security, quality of service and other standing alarms as would be apparent to one of skill in the art.

Some functionality provided with various telecommunications NEs may not considered essential to the satisfactory operation of the telecommunications network and may therefore be excluded from the list of essential common network management functions. In a preferred embodiment, for example, as long as the element management system has the capacity to set the current time on each NE, it is not essential to the management of the telecommunications network to support the function of setting the current time for the entire network as a whole, since sending a "set time" command to each NE would have the same effect. In a preferred embodiment, other non-essential network management functions include, for example:

retrieving the current time on a specified telecommunications NE;

resynchronizing the entire network;

resynchronizing the current alarm list for the telecommunications NE; and resynchronizing the performance management data for a specified time period for a specified telecommunications NE.

The basic microwave radio network management functions, in accordance with a preferred embodiment, comprise the functions of invoking and releasing protection for the telecommunications NE, and requesting a manual exercise on one protection unit, related to the regular channel on the telecommunications NE in order to insure that the protection (or redundant) channel can carry traffic, without actually switching traffic to the protection channel.

In a preferred embodiment, the basic fiber optic device network management functions comprise the functions of retrieving, entering, editing and removing a fiber optic facility (hardware and software components used to provision a communication path) and retrieving, performing and removing a cross-connection on the telecommunications NE. In a preferred embodiment depicted in FIG. 1, after Select Basic Functions step 102, in the method of the present invention the step of creating an element-independent telecommunications management message, in a common telecommunications network management protocol, for each selected telecommunications management function, is performed in Create Element-Independent Message step 103. This step is begun in a preferred embodiment by defining a structural definition and functional interface for the selected function. The functional interface is characterized by creating a name, syntax, parameter list and associated callback method for the selected function.

For example, in a preferred embodiment, an element-independent network management message for the function of retrieving the current list of standing alarms from a specified network element is created as follows. Using CORBA IDL (Interfact Definition Language), a structure (or data type) is defined for the function's input parameter:

Typedef string NEName;

This instruction creates a string data type, which can now be used in subsequent function calls. Next a CORBA IDL function is defined, as follows:

Oneway void RetrieveNEAlarms (in EMSCOMMON::NEName neName);

As would be apparent to one of skill in the art, the phrase "Oneway void" in the above function indicates that no immediate response to the message is expected. In other words, this is a "oneway" message. As suggested by its name, the function "RetrieveNEAlarms" directs the NE to provide the EMS with current status of any alarms activated in the NE. As also apparent to one of skill in the art, the word "in" in the above function indicates that the parameter that follows ("neName") is an "input" parameter, as opposed to "output" parameter. The input parameter "neName" is supplied to the CORBA implementation function in order to identify the telecommunications network element from which the current list of alarms is to be extracted and the descriptor "EMS COMMON" identifies a module containing the definitions for the data type "NEName" (in this case a string).

Thus, when the above-described "RetrieveNEAlarms" function is used ("called") in an application program, an element-independent network management message is created and sent to the telecommunications network element. The message is "element-independent" because it will operate on any telecommunications network element in the network, regardless of the network element's type, protocol or manufacturer. When all of the standing alarms on the network element have been obtained, a "callback" function is activated, which will supply the application program with a list of standing alarms.

The example message above has one input parameter, "neName," and no output parameters. Other messages may be created in accordance with the present invention, and other programming languages may be used, with or without incorporating multiple input and output parameters and associated callbacks, as would be evident to one of ordinary skill in the art. From the above example, it is also readily apparent to those of ordinary skill in the art how to create other element-independent network management message for specified network management functions in accordance with the present invention.

In alternative preferred embodiments, basic network management functions may be implemented by telecommunications network element, by devices connected to telecommunications network elements, by other components, or by a combination of elements, devices and components in the network or the EMS as would be apparent to one of ordinary skill in the art.

In a preferred embodiment, the basic network management functions identified in Select Basic Functions step 102 are implemented in Create Element-Independent Message step 103, using twenty-eight element-independent network messages:

set_NETime—Sets the time for a specified NE.

set_ThresholdData—Sets threshold values for performance management attributes for an NE.

get_NE24HourPmData—Retrieves twenty-four hour performance attributes for a specified NE for specified dates and sends the response data upstream.

get_NE15MinPmData—Retrieves fifteen-minute performance attributes for a specified connected NE and sends the response data upstream.

get_CurrentNE15MinPmData—Retrieves current fifteen-minute performance attributes for a specified NE and sends the response data upstream.

set_ExternalOutputControl—Updates the external output control attributes for a specified NE and sends a response code upstream.

Perform_externalOutputControl—Sends a pulse or latch signal to a specified pin on the external output interface of a specified NE and sends a response code upstream.

set_ExternalInputPoint—Updates the external input control attributes in a specified NE and sends a response code upstream.

get_operationalState—Retrieves the current operational state for a specified NE.

Get_Equipment—Retrieves a single equipment entity (e.g., a circuit board) for a specified NE.

Get_MUXFacility—Retrieves a single fiber-optic device facility (e.g., signal or port) for a specified NE.

Get_MUXCrossConnections—Retrieves existing cross connections for a specified fiber-optic NE.

Enter_Equipment—Provides initial equipment attributes or characteristics for a specified NE.

Edit_Equipment—Edits existing equipment attributes or characteristics for a specified NE.

Remove_Equipment—Removes an existing equipment entity for a specified NE.

Enter_MUX_Facility—provides an initial fiber-optic device facility for a single NE.

Edit_MUX_Facility—Edits the attributes or characteristics of an existing fiber-optic device facility for a single NE.

Remove_MUX_Facility—Removes an existing fiber-optic device facility for a single NE.

Connect—Connects two optical or electrical termination points for a fiber-optic device in order to create a circuit through a specified NE at a specified rate, and sends a response code and the identifier of the circuit upstream.

Disconnect—Disconnects an existing circuit for a specified NE and sends a response code upstream.

Get_AllProtectionGroups—Retrieves protection group objects (e.g., protection subsystems) for a specified NE.

Get_ProtectionUnits—Retrieves protection unit objects (e.g., redundant and normal channels) for a specified NE.

Invoke_Protection—Requests that a NE switch from its regular channel or protection unit to a redundant or backup channel or protection unit and sends a response code upstream.

ReleaseProtection—Requests that a NE switch back to its normal channel or protection unit form a redundant or backup channel or protection unit and sends a response code upstream.

RadioInvokeExercise—Requests that a NE perform a switch from its regular channel or protection unit to a redundant or backup channel or protection unit without actually routing traffic onto the redundant channel or protection unit, and sends a response code upstream.

RetrieveNEAlarms—Retrieves existing alarms for a specified NE.

ClearAlarm—Clears a standing alarm within the EMS and for a specified NE.

ProcessEVent—Passes unsolicited event and alarm information (NotificationInfo) throughout the EMS.

A core set of element-independent network management messages may readily be divided into downstream element-independent network management messages and upstream element-independent network management messages, as is readily apparent to one of skill in the art.

Figure 2:
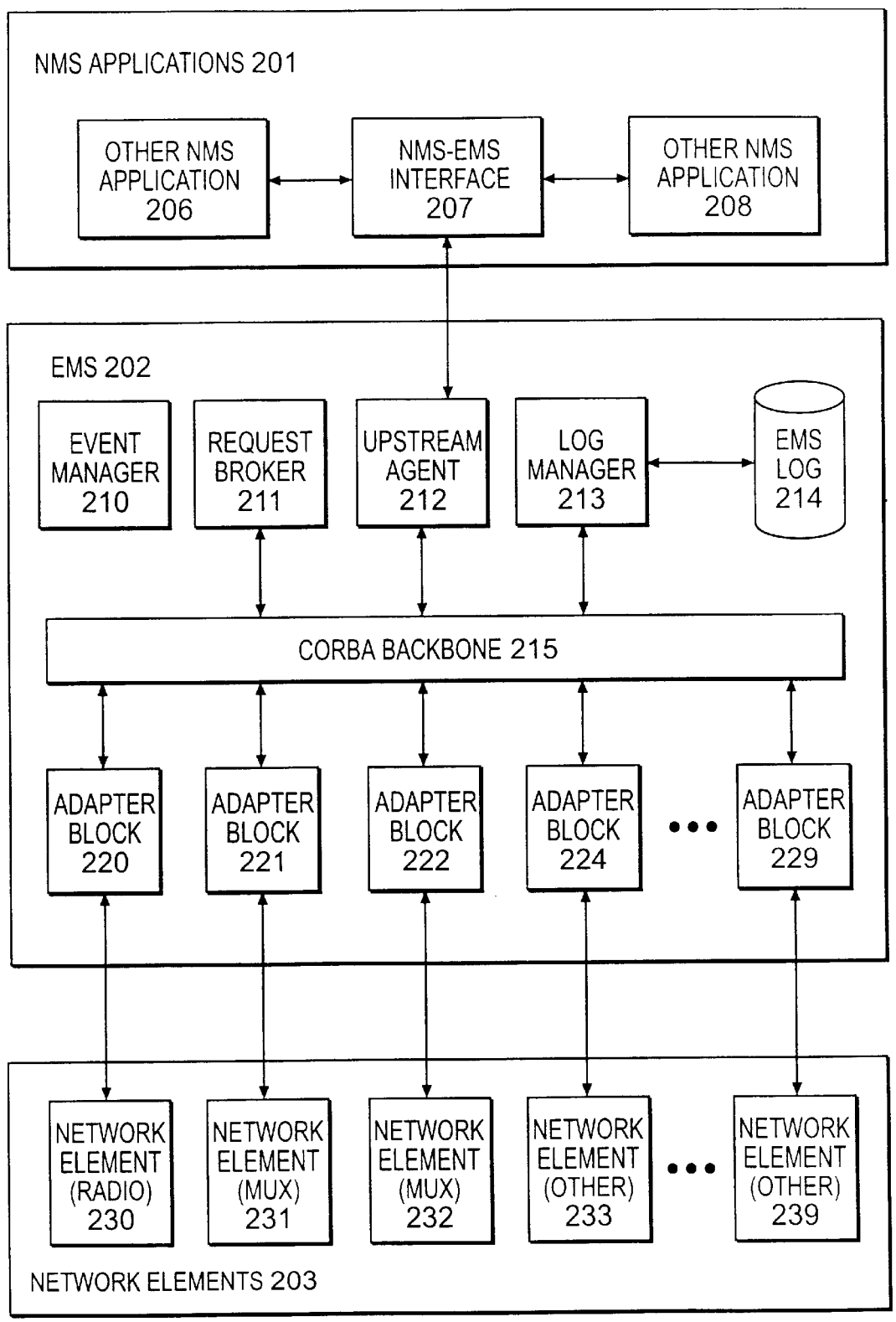
FIG. 2 depicts an embodiment of an EMS according to the present invention.

FIG. 2 depicts a preferred embodiment of an element management system in accordance with the present invention, including (a) means for receiving, from a software application, a downstream element-independent network management message selected from a core set of downstream element-independent network management messages, for transmission to a telecommunications NE; (b) means for mapping the downstream element-independent network management message into a downstream element-dependent network management message, and into an element-dependent protocol, for the telecommunications NE; and (c) means for transmitting the downstream element-dependent network management message to the telecommunications NE.

With reference to the preferred embodiment shown in FIG. 2, the receiving means of an EMS system 202 according to the present invention is Upstream Agent 212. As depicted in FIG. 2, Upstream Agent 212 receives a downstream element-independent network management message from a Network Management Layer software application, depicted in FIG. 2 as NMS-EMS Interface 213, for transmission to a telecommunications network element, depicted in FIG. 2 as Network Element 230. Other Network Elements 231–239 are also depicted in FIG. 2. In a preferred embodiment, the downstream element-independent network management message received by Upstream Agent 212 is selected from a core set of downstream element-independent network management messages developed in accordance with the method described with reference to FIG. 1. Upstream Agent 212 provides an external interface, in a standardized protocol, such as Q3 or other protocol known to one of skill in the art, between EMS 202 and NMS-EMS Interface 207 and Network Management Layer applications and products, such as Other NMS Application 206 and Other NMS Application 208 in NMS Applications 201. Upstream Agent 212 also receives messages to be forwarded to NMS-EMS Interface 207. In a preferred embodiment, Upstream Agent 212 may be implemented in hardware, software, or a combination of both, as is known to persons of skill in the art.

In the preferred embodiment depicted in FIG. 2, the means for mapping the downstream element-independent network management message into a downstream element-dependent network management message is Adapter Block 220. Adapter Blocks 221–229 perform similar functions. In the preferred embodiment depicted in FIG. 2, Upstream Agent 212 passes an element-independent downstream message to Request Broker 211, which in turn passes the element-independent network management message to one of Adapter Blocks 220–229 serving the NE identified in the network management message. Each adapter block is suitably equipped to receive (and transmit) network management messages. Request Broker 211 may be implemented using hardware, software or a combination of both, as known to persons of skill in the art, and using techniques for routing network management messages to adapter blocks serving specific NEs as known to persons of skill in the art.

As depicted in FIG. 2, Adapter Blocks 220 through 229 map (or translate) the downstream element-independent message into an element-dependent network management message and an element-dependent protocol, such as TL-1, SNMP or Q3, for a specified NE. Network Element 230 through 239 may comprise, for example, microwave radios, and fiber optic devices such as digital multiplexers. In a preferred embodiment depicted in FIG. 2, Adapter Block 220 serves Network Element 230 which is for example a radio. Adapter Block 221 serves Network Element 231, which is for example a multiplexer, and so forth. This service includes transmitting and receiving network management messages, using suitable hardware and software, to and from adapter blocks.

In a preferred embodiment, multiple units of the same type and manufacture of a network element may be served by a single adapter block. For example, all NEC microwave radios in a network may be served by a single adapter block. It is also possible that a single adapter block may serve network elements of different types and different manufacturers, as would be apparent to one skilled in the art, without departing from the present invention. Request Broker 211 may thus route a single message to multiple adapter blocks. For example, in the preferred embodiment depicted in FIG. 2, to reset the time on an entire network, Request Broker 211 would send a single element-independent message to all Adapter Blocks 220 through 229.

With reference to FIG. 2, in a preferred embodiment, another example of the mapping function occurs in connection with the transmission by Request Broker 211 of an element-independent network management message, "Connect," to Network Element 231 (a fiber-optic add/drop multiplexer as depicted in FIG. 2). This message instructs that multiplexer to establish a connection within the multiplexer to form a circuit from point A to point B. The element-independent message is transmitted to Adapter Block 221 serving Network Element 231, and includes information sufficient for Network Element 231 to receive and execute the instruction. Such information includes, for example, the identity of Network Element 231 according to the specific telecommunications network, the identifiers of the "from" and "to" ports, and an identifier specifying the transmission rate. In the preferred embodiment depicted in FIG. 2, Adapter Block 221 receives the Connect message, and, using a combination of hardware and software as is known to one of skill in the art, selects an appropriate message for enabling Network Element 231 to execute the instruction. In a preferred embodiment, this selection is accomplished using a table look-up or other methods known to one of skill in the art for mapping the element-independent network management message to an appropriate corresponding element-dependent message. Adapter Block 221 then creates an element-dependent message, in the protocol utilized by the particular type and manufacture of network Element 231 (e.g., Q3), including information sufficient to enable Network Element 231 to execute the Connect instruction to establish a connection to form a circuit between point A and point B within Network Element 231.

(In this example, at some later time Network Element 231 generates an element-dependent response to the Connect instruction, in order to inform EMS 202 that the connection has been formed, and providing an identifier for the connection. This response message is an element-dependent upstream message. The mapping of element-dependent upstream messages into element-independent network management messages, and their upstream transmission from network elements, are described in detail below.)

In a preferred embodiment depicted in FIG. 2, the means for transmitting the downstream element-dependent network management message to the telecommunications network element are Adapter Blocks 220–229. This transmission is accomplished using equipment and techniques as are known to those of skill in the art.

In another preferred embodiment (not depicted), the functions of Upstream Agent 212, Request Broker 211 and adapter Blocks 220 through 229, as described above, may be implemented, without diverging from the scope of the present invention, by various structures, as would be apparent to those of ordinary skill in the art. Similarly, in another preferred embodiment (also not depicted) the functions of Upstream Agent 212, Request Broker 211 and Adapter Blocks 220 through 229, as described above, may also be implemented by means of other separate structures or a combination of structures, different from those depicted in FIG. 2.

As depicted in FIG. 2, an EMS of the present invention may include (a) means for receiving an upstream element-dependent network management message from a telecommunications network element; (b) means for mapping the upstream element-dependent network management message into a upstream element-independent network management message selected from a core set of upstream element-independent network management messages, and into a common element-independent message protocol; and (c) means for transmitting the upstream element-independent network management message to a software application.

In a preferred embodiment depicted in FIG. 2, the means for receiving an upstream message from Network Element 230 is Adapter Block 220. Adapter Blocks 221–229 perform similar functions with respect to Network Elements 231–239, respectively. As depicted in FIG. 2, the receiving means may be implemented using techniques and technologies as known to one of skill in the art. According to the present invention, upstream element-dependent messages may be solicited (for example in response to a downstream message) or unsolicited (for example in response to an alarm triggered by a NE, as known to one of skill in the art). Each Adapter Block 220–229 maps each received upstream element-dependent network management message into an upstream element-independent network management message. Again, these element-independent network management messages are selected from a core of upstream element-independent network management messages created in accordance with the method of the present invention described with reference to FIGS. 1 and 2, above. Adapter Blocks 220 through 229 also translate the element-dependent message into a common element-independent message protocol, as known to one of skill in the art.

For example, with reference to FIG. 2, in a preferred embodiment an unsolicited network element-dependent alarm message may be generated by Network Element 230. The element-dependent alarm message is transmitted in the protocol (e.g., Q3) used by the particular manufacturer for the particular equipment type of Network Element 230. The message would typically specify the alarm type (e.g., equipment alarm, software alarm, environmental alarm, communications alarm) and the probable cause (e.g., power loss, software interruption, enclosure entry, signal loss). The element-dependent alarm message is received by Adapter Block 220 serving Network Element 230. In a preferred embodiment, a combination of computer hardware and software in Adapter Block 220, as known to one of skill in the art, parses the element-dependent alarm message, extracting the information to be transmitted to Event Manager 210, including the identity of Network Element 220, the fact that the messages in an unsolicited alarm message, the type of the alarm, and the probable cause. The combination of hardware and software in Adapter Block 220 then determines that element-independent network management message "ProcessEvent" is the appropriate network management message from the set of core network management messages, for transmitting the alarm message information to Event Manager 210. This determination is made using a table look-up or other method, as is known to one of skill in the art, for selecting the "ProcessEvent" message to send in response to the received element-dependent alarm message. The combination of hardware and software in Adapted Block 220 also creates an element-independent network management message "ProcessEvent," using CORBA, including appropriate information, such as the identity of Network Element 220, the type of the alarm, and probable cause information. Adapter Block 220 then transmits that element-independent message, via CORBA Backbone 215, to Event Manager 210. In a preferred embodiment, unsolicited messages are generally routed from the Adapter Blocks 220–229, directly to Event Manager 210 where the messages (in the form of element-independent messages) are then distributed to other EMS applications such as Log Manager 213 and Upstream Agent 212.

As is apparent to one of skill in the art, the mapping of other upstream element-dependent network management messages into corresponding upstream element-independent network management messages (and the mapping of downstream element-independent network management messages into corresponding downstream element-dependent network management messages) may be similarly accomplished. In a preferred embodiment, a CORBA IDL compiler and Object Request Broker implementation, available from IONA Technologies (Orbix™ product) is used to facilitate the establishment of the correspondences between element-dependent and element-independent upstream network management messages, and between element-dependent and element-independent downstream network management messages. Other compilers and implementations may be used, as known to those of skill in the art.

In a preferred embodiment, responses by the NEs to downstream messages (as distinguished from unsolicited upstream messages) which are mapped to element-independent messages by Adapter Blocks 220–229 are routed to Request Broker 211, which then further routes the element-independent message (e.g., Connect_Response) as a callback to the originating application. In a preferred embodiment, the message routing scheme of Adapter Blocks 220–229 routes all unsolicited messages to Event Manager 210 and all Responses (to previous downs-stream requests) to Request Broker 211. In such an embodiment, Adapter Blocks 220–229 simply note the type of messages received to determine how to route any response element-independent upstream message.

In the preferred embodiment depicted in FIG. 2, the means for transmitting the upstream element independent network management message to a software application includes Request Broker 211 and Upstream Agent 212. As depicted in FIG. 2, Request Broker 211 receives network management messages from Adapter Blocks 220–299, and routes those messages to Upstream Agent 212, which in turn transmits them upstream to NMS-EMS Interface 213 in NMS Applications 201. Means, techniques and equipment for transmitting messages to software applications are known to one of skill in the art.

As depicted in FIG. 2, an EMS of the present invention may include (a) means for processing fault management information; (b) means for logging all network notifications and events into a database; (c) means for forwarding email from the software application; and (d) means for storing notifications and events.

In a preferred embodiment depicted in FIG. 2, means for processing fault management information is Event Manager 210, which is the central processing entity for the EMS, responsible for managing all "standing alarms," as well as providing synchronization between itself and an optional fault management software application (not depicted). In a preferred embodiment, all events that are generated within the EMS are processed by Event Manager 210. Event Manager 210 correlates events received from user interface applications (not depicted) and Adapter Blocks 220–229, and synchronizes this constantly changing list with registered client applications.

In a preferred embodiment, Event Manager 210 also provides alarm correlation (i.e., certain sets of alarms will invoke other alarms), alarm translation, alarm filtering, e-mail user notifications and external alarm feeds for other third-party network management systems (typically through EMS-NMS interface 207). In addition to receiving fault and alarm data, Event Manager 210 also processes performance data and forwards the performance data to the appropriate log manager, depicted in FIG. 2 as Log Manager 213, for insertion into an EMS Log 214.

In a preferred embodiment, Event Manager 210 receives three types of messages from Adapter Blocks 220–229:

unsolicited messages, twenty-four hour performance data, and eight-hour performance data (i.e., thirty-two sets of fifteen-minute performance data). An unsolicited message is generated, for example, when an alarm or other similar event has occurred on network Elements 230–239. In a preferred embodiment, Log Manager Server 213 maps data as received, from Adapter Blocks 230–239 through Event Manager 210, into pre-defined schema objects in the EMS Log 214.

Figure 3:
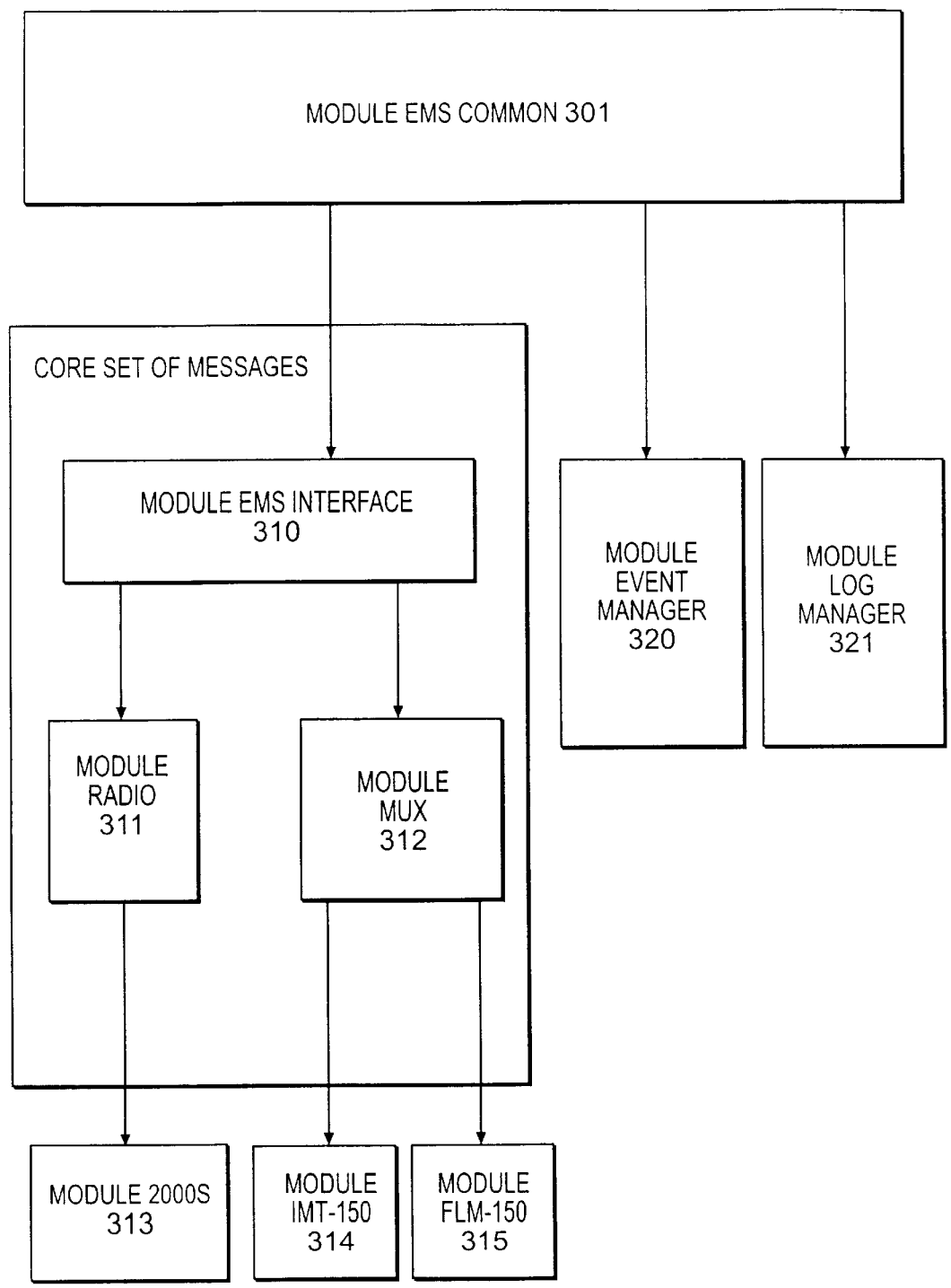
FIG. 3 depicts, in a preferred embodiment of an EMS according to the present invention, the logical relationship between network management messages in a core set of network management messages.

FIG. 3 depicts, in a preferred embodiment of an EMS according to the present invention, the logical relationship between network management messages in the core set of network management messages. In the preferred embodiment depicted in FIG. 3, Module EMSCommon 301 provides data-type definitions for core network management messages common to all applications within the EMS, including Module EMS Interface 310, Module Event Manager 320 and Module Log Manager 321. Module EMS Interface 310, which provides the core network management messages common to all NEs in the EMS, inherits (utilizes) the data-type definitions defined in Module EMSCommon 301. So, for example, if Module EMSCommon 301 defines the data type for NEName as a "string," Module EMS Interface 310 can utilize the NEName string type. Module Event Manager 320 and Module Log Manager 321 are specific applications that utilize data-type definitions from EMSCommon. In a preferred embodiment, other applications (not shown in FIG. 3) such as a request broker and an EMS agent, are implemented similarly.

In the preferred embodiment depicted in FIG. 3, Module Radio 311 and Module MUX 312 provide the core set of type-specific network management messages for digital microwave radios and fiber optic devices, respectively. In this embodiment, each of Module Radio 311 and Module MUX 312 inherits the type definitions defined in Module EMS Interface 310. NE-specific interfaces, depicted in FIG. 3 as Module 2000S 313, Module IMT-150 314 and Module FLM-150 315 contain type definitions for core network management messages for specific NEs. In the preferred embodiment depicted in FIG. 3, Module 2000S 313 inherits type definitions from Module Radio 311; and Module IMT-150 314 and Module FLM-150 315 inherit type definitions from Module MUX 312. In a preferred embodiment, additional NE-specific modules are implemented similarly.

Figure 4:
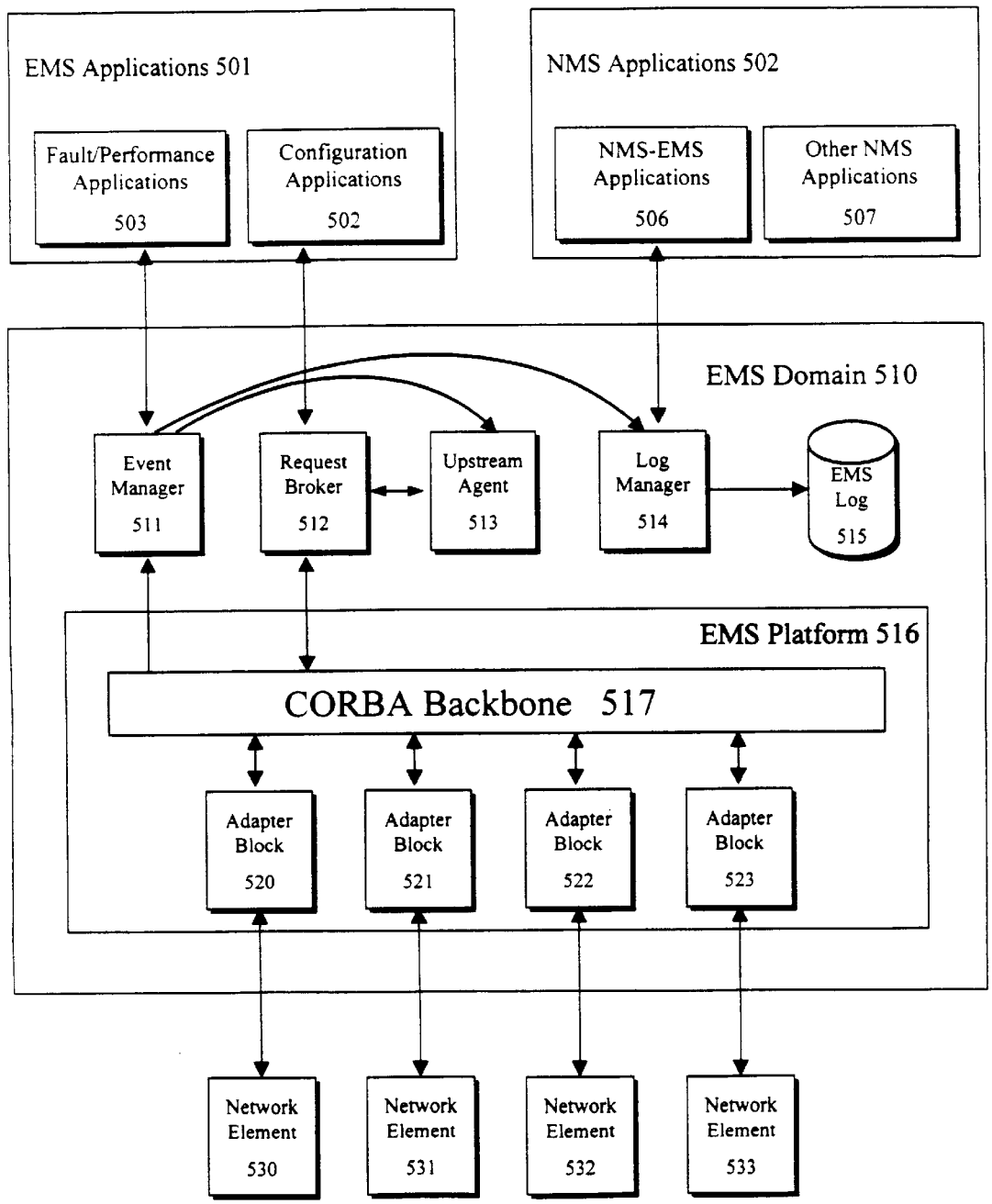
FIG. 4 depicts the upstream and downstream flows of network management messages in a preferred embodiment of an EMS according to the present invention.

FIG. 4 depicts network management message flows in a preferred embodiment of an EMS of the present invention. It should be noted that each of the message flows depicted in FIG. 4 is a logical message flow, and may be implemented, as is known in the art, using a physical or electronic path different from the logical message path. As depicted in FIG. 4, a preferred embodiment of an EMS includes EMS Applications 501, NMS (Network Management System) Applications 505, and EMS Domain 510. EMS Applications 501 includes Fault Performance Applications module 503 and Configuration Applications module 502. NMS Applications 505 includes NMS-EMS Interface 506 and other NMS Applications 507.

In the preferred embodiment depicted in FIG. 4, EMS Domain 510 includes Event Manager 511, Request Broker 512, Upstream Agent 513, Log Manager 514, EMS Log 515, and EMS Platform 516. EMS Platform 516, in turn, includes CORBA Backbone 517 and Adapter Blocks 520, 521, 522 and 523. As is apparent to one of skill in the art, adapter blocks may be added or removed from the embodiment depicted in FIG. 4.

The functions and structures of each of the applications, modules, domains, platforms, managers, agents, blocks and other elements depicted in FIG. 4 are described with reference to FIG. 2 or 3, above, or are apparent to one of skill in the art in light of those descriptions. Each of those functions may be implemented in hardware or software, or a combination of hardware and software, and in various structures as known to one of skill in the art.

In the preferred embodiment depicted in FIG. 4, NE-independent network management messages are transmitted:

from Event Manager 511 to Fault/Performance Applications 503;

from Event Manager 511 to Upstream Agent 513;

from Event Manager 511 to Log Manager 514;

from Request Broker 512 to Configuration Applications module 502, and from Configuration Applications module 502 to Request Broker 512;

from Request Broker 512 to Upstream Agent 513, and from Upstream Agent 513 to Request Broker 512;

from Upstream Agent 513 to NMS-EMS Interface 506, and from NMS-EMS Interface 506 to Upstream Agent 513; and from Log Manager 514 to EMS Log 515;

from Request Broker 512 via CORBA Backbone 517 (the NE-independent messages transmitted between these two modules include NE-independent request messages and NE-independent messages in response to those request messages);

via CORBA Backbone 517 to Event Manager 511 (including unsolicited NE-independent alarm messages); and via CORBA Backbone 517 to and from each of Adapter Blocks 520–523.

In the preferred embodiment depicted in FIG. 4, NE-dependent network management messages flow in each direction between each of Adapter Blocks 520, 521, 522 and 523 and the specific Network Element 530, 531, 532 or 533 served by the respective Adapter Block.

The composition of NE-independent and NE-dependent network management messages, and the mapping between NE-independent and NE-dependent network management messages are described in detail with reference to FIGS. 1, 2 and 3, above.

Figure 5:
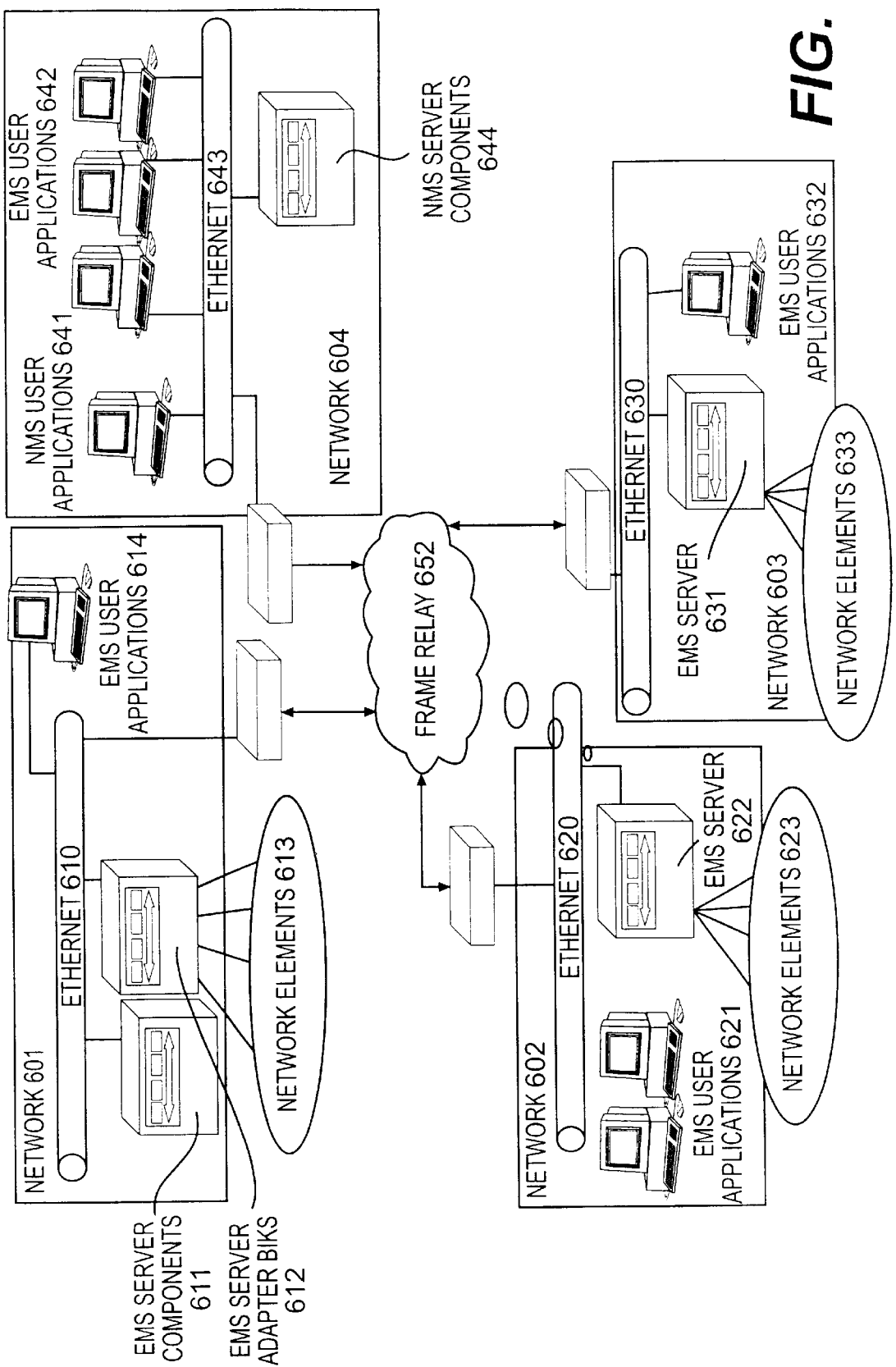
FIG. 5 depicts an alternate preferred embodiment of an EMS according to the present invention.

In an example of another preferred embodiment of an EMS according to the present invention, depicted in FIG. 5, multiple EMSs may be distributed geographically to manage separate networks or network segments as needed. In the example shown in FIG. 5, Networks 601, 602, 603 and 604 are coupled to each other by means of Ethernets 610, 620, 630 and 643, Routers 650, 651, 653 and 654, and Frame Relay network 652. In Network 601, the EMS is distributed among two structures, EMS Server Components 611 and EMS Server Adapter Blks 612. In a preferred embodiment, EMS Server Components 611 contains basic EMS components described in detail above, such as an Event Manager, a Log Manager, a Request Broker, and an Upstream Agent (not depicted). The other structure in Network 601, depicted as EMS Server Adapter Blks 612, contains all of the adapter blocks serving Network Elements 613. The function and operation of adapter blocks is described in detail with reference to FIGS. 2 and 4. In the preferred embodiment depicted in FIG. 5, user application, such as an accounting program, may reside in yet another structure, depicted in FIG. 5 as EMS User Applications 614. In the EMS embodiment illustrated by Network 601, the EMS behaves as it would if all components were deployed in a single structure.

In the networks depicted in FIG. 5 as Networks 602 and 603, all EMS Server Components are deployed on a single structure, illustrated in FIG. 5 by EMS Servers 622 and 631 for each of Network 602 and Network 603, respectively. The EMS User Applications 621 and 632 may be deployed on one or more separate workstations, and those may be available over Ethernets 620 and 630, for each of Networks 602 and 603.

In the preferred embodiment depicted in FIG. 5, Network 604 supports a network management center for Networks 601, 602 and 603. EMS User applications 642 support NE management functions for each of Networks 601, 602 and 603, thus enabling centralized management of the NEs in each of those networks. NMS Server 644 and NMS User Applications 641 support network management functions at the TMN Network Layer, providing enhanced management capabilities at a higher level, as known to one of skill in the art.

The connection of separate networks through Frame Relay 652 illustrates one embodiment of the present invention. In alternative embodiments, the links between separate networks may be established through other telecommunications networks and devices, as known to one of skill in the art.

As more networks or network segments are added, additional EMSs may be deployed as needed without impacting performance of any existing EMSs. If a single EMS must manage a large number of NEs, then the EMS itself may be distributed over several machines.

The present invention has been disclosed and described herein in what is considered to be its most preferred embodiments. It should be noted that variations and equivalents may occur to those skilled in the art upon reading the present disclosure and that such variations and equivalents are intended to come within the scope of the invention and the appended claims.

We claim:

1. An element management system for a telecommunications network, comprising
    means for receiving, from a software application, a downstream element-independent network management message selected from a core set of downstream element-independent network management messages, for transmission to a telecommunications network element, wherein the core set of downstream element-independent network management messages comprises a reduced number of downstream network management messages supporting basic telecommunications network management functionality, and, wherein, with respect to at least one telecommunications network element in the telecommunications network, basic telecommunications network functionality comprises core common network management functions and core equipment type-specific network management functions;
    means for mapping the downstream element-independent network management message into a downstream element-dependent network management message, and into an element-dependent protocol, for the telecommunications network element; and
    means for transmitting the downstream element-dependent network management message to the telecommunications network element.

2. An element management system for a telecommunications network, comprising
    means for receiving an upstream element-dependent network management message from a telecommunications network element;
    means for mapping the upstream element-dependent network management message into an upstream element-independent network management message selected from a core set of upstream element-independent network management messages, and into a common element-independent message protocol, wherein the core set of upstream element-independent network management messages comprises a reduced number of upstream network management messages supporting basic telecommunications network management functionality, and, with respect to at least one telecommunications network element in the telecommunications network, basic telecommunications network functionality comprises core common network management functions and core equipment type-specific network management functions; and
    means for transmitting the upstream element-independent network management message to a software application.

3. An element management system according to claim 2, wherein at least one message of the core set of upstream element-independent network messages corresponds to a message of a core set of downstream element-independent network messages.

4. An element management system according to claim 2, wherein at least one upstream element-dependent network management message responds to a downstream element-dependent network management message.

5. An element management system according to claim 1 or 2, further including means for forwarding application requests to a specified telecommunications network element.

6. An element management system according to claim 1 or 2, wherein the core common network management functions comprise the functions of:
    monitoring faults and alarms in the telecommunications network element;
    configuring the telecommunications network element;
    monitoring performance of the telecommunications network element; and
    monitoring security of the telecommunications network element.

7. An element management system according to claim 1 or 2, wherein the core common network management functions comprise the functions of:
    setting a time clock for the telecommunications network element;
    setting threshold values for the telecommunications network element;
    retrieving performance data for a specified time period for the telecommunications network element;
    updating the external output control on the telecommunications network element;
    sending a signal to the external output interface on the telecommunications network element;
    updating the external input control attributes on the telecommunications network element;
    retrieving the operational status of the telecommunications network element;
    processing equipment information from the telecommunications network element;
    retrieving and updating protection status for the telecommunications network element; and
    processing alarms.

8. An element management system according to claim 1 or 2, wherein the core equipment type-specific network management functions comprise:

core microwave radio network management functions; and core fiber optic device network management functions.

9. An element management system according to claim 8, wherein the core microwave radio network management functions comprise the functions of:

invoking and releasing protection status for the telecommunications network element; and requesting a manual exercise on a protection unit related to a regular channel used by the telecommunications network element.

10. An element management system according to claim 8, wherein the core fiber optic device network management functions comprise the functions of:

retrieving, entering, editing and removing a facility of a fiber optic device; and retrieving, performing and removing a cross-connection of a fiber optic device.

11. An element management system according to claim 1 or 2, further comprising means for processing fault management information.

12. An element management system according to claim 1 or 2, further comprising means for logging network notifications and events into a database.

13. An element management system according to claim 1 or 2, further comprising means for forwarding e-mail from a network management software application.

14. An element management system according to claim 1 or 2, further comprising means for communicating with a network management software application.

15. An element management system according to claim 1 or 2, further comprising means for storing notifications and events concerning the telecommunications network element.

16. An element management system according to claim 1 or 2, wherein the telecommunications network includes telecommunications network elements of more than one type.

17. An element management system according to claim 1 or 2, wherein the telecommunications network includes telecommunications network elements of more than one manufacturer.

18. An element management system according to claim 1 or 2, wherein the telecommunications network element is selected from a group consisting of a microwave radio and a fiber optic device.

19. An element management system for a telecommunications network, the element management system comprising:

at least one adapter block, wherein each adapter block receives a plurality of upstream element-dependent network management messages from at least one network element served by the adapter block;

maps each upstream element-dependent network management message into one of a plurality of upstream element-independent network management messages;

sends upstream element-independent network management messages to a communications backbone;

receives a plurality of downstream element-independent network management messages, from the communications backbone, for at least one network element served by the adapter block;

maps each downstream element-independent network management message into a downstream element-dependent network management message; and sends downstream element-dependent network management messages to at least one network element served by the adapter block;

wherein the communications backbone receives downstream element-independent network management messages, from a network management request broker, for transmission to at least one network element served by the adapter block; and sends upstream element-independent network management messages from the adapter block to the request broker; and wherein the request broker communicates with network management applications.

20. The element system of claim 19, wherein the communications backbone sends upstream element-independent network management messages from the adapter block to an event manager in communications with network management applications.

21. An adapter block for an element management system for a telecommunications network, the adapter block comprising:

an upstream receiver for receiving a plurality of upstream element-dependent network management messages from at least one network element served by the adapter block;

a downstream transmitter for sending a plurality of downstream element-dependent network management messages to the network element;

an upstream transmitter for sending a plurality of upstream element-independent network management messages to a communications backbone in communications with the adapter block;

a downstream receiver for receiving a plurality of downstream element-dependent network management messages from the communications backbone; and processing means for mapping each upstream element-dependent network management message into one of the plurality of upstream element-independent network management messages, and for mapping each downstream element-independent network management message into one of the plurality of downstream element-dependent network management messages.

22. The adapter block of claim 21, wherein the communications backbone receives downstream element-independent network management messages, from a network management request broker, for transmission to at least one network element served by the adapter block; and sends element-independent network management messages from the adapter block to the request broker.

23. The adapter block of claim 22, wherein the request broker communicates with network management applications.

24. The adapter block of claim 23, wherein the communications backbone sends upstream element-independent network management messages from the adapter block to an event manager in communication with network management applications.

* * * * *